J. W. Hoard.

Making Eyelets.

N° 54,646.    Patented May 8, 1866.

Witnesses:

Inventor:
J. W. Hoard

UNITED STATES PATENT OFFICE.

JOHN W. HOARD, OF BRISTOL, RHODE ISLAND, ASSIGNOR TO HIMSELF, S. W. YOUNG, AND R. A. DENNISON.

IMPROVEMENT IN EYELET-STOCK.

Specification forming part of Letters Patent No. 54,646, dated May 8, 1866.

*To all whom it may concern:*

Be it known that I, JOHN W. HOARD, of Bristol, in the county of Bristol and State of Rhode Island, have invented certain new and useful Improvements in the Process of Preparing Stock for Making Eyelets by Machinery; and I hereby declare the following to be a full, clear, and exact description of the same, reference being had to the accompanying drawings, in which—

Figure 1:
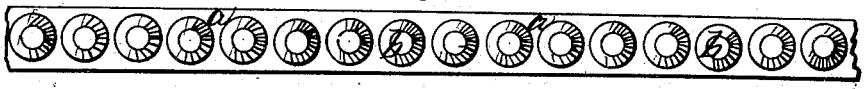
Figure 2:

Figure 1 represents a plan view of a strip of brass prepared in accordance with my invention, and Fig. 2 a longitudinal section of the same.

In the manufacture of eyelets as ordinarily conducted the band or strip of brass or other malleable metal of which the eyelets are made is fed to a machine in which there are dies of the form and size desired for the eyelets. As the band passes through the machine the punch and dies cut out and shape the eyelets at one blow.

The disadvantage attending this operation is as follows: The eyelet-blank or metal cut out of the band to form the eyelet, if it were not stretched and shaped by the dies, would be an annular disk—*i. e.*, a round disk having a circular aperture which is concentric with the outer periphery of the disk. When this disk is shaped by the dies the metal nearest the center, which forms the smaller end of the eyelet, is stretched to a considerable degree in order that the aperture may be of the proper size, while the metal nearest the outer periphery of the disk, which forms the larger end of the eyelet, is proportionately compressed. This produces a sudden strain upon the metal, which often splits and cracks it and renders the edges of the eyelet ragged and uneven.

The object of my invention is to remedy these defects in the manufacture of eyelets, so as to make their form, and especially that of their edges, uniform, even, and regular, and to prevent the weakening of the metal consequent on the sudden strain to which it is usually subjected.

After many experiments I have found that this object can be accomplished by gradually stretching and shaping the eyelet-blank, or, in other words, preparing the stock for making eyelets by a preliminary process, by which the eyelet-blank is made to approach the shape of the finished eyelet without being detached or cut out from the band or strip.

To enable others skilled in the art to understand and use my invention, I will now proceed to describe its nature and operation, referring at the same time to the accompanying drawings and letters of reference marked thereon.

According to my method, the flat metal band or stock from which the blanks are to be cut is fed to a machine provided with dies of the form and size required, which shape the metal into little cups or frustums of cones (represented at *b b*, Figs. 1 and 2,) which bear some resemblance to the form of the finished eyelet, but are still attached to and form part of the metal strip *a*. As soon as this operation is completed the stock thus prepared, as represented in the drawings, may be fed directly to the eyelet-machine, which will punch out the dished blanks and shape them into their ultimate eyelet form, or it may be passed through an intermediary process of annealing to give it still greater malleability before being fed to the eyelet-machine.

By this method the cracking and splitting of the metal stock is avoided and a much more perfect eyelet is produced than by the ordinary process of shaping and punching out the eyelet from the flat metal band at one blow.

What I claim as my invention, and desire to secure by Letters Patent, is—

The stock prepared as herein described—that is to say, the strip or band in which a series of cups or depressions is formed approaching the form and size required for the finished eyelets, substantially as and for the purposes herein set forth.

In testimony whereof I have signed my name to this specification before two subscribing witnesses.

J. W. HOARD.

Witnesses:
   A. POLLOK,
   EDM. F. BROWN.